(12) United States Patent
Osada

(10) Patent No.: US 7,259,540 B2
(45) Date of Patent: Aug. 21, 2007

(54) ELECTRONIC EQUIPMENT HAVING BATTERY CONTACT MEMBER PROVIDED IN BATTERY CHAMBER

(75) Inventor: Yoichi Osada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 378 days.

(21) Appl. No.: 10/947,385

(22) Filed: Sep. 23, 2004

(65) Prior Publication Data

US 2005/0068004 A1 Mar. 31, 2005

(30) Foreign Application Priority Data

Sep. 30, 2003 (JP) .............................. 2003-341283

(51) Int. Cl.
*H01M 10/46* (2006.01)
(52) U.S. Cl. ..................................................... 320/112
(58) Field of Classification Search ................ 320/107, 320/110, 111, 112
See application file for complete search history.

(56) References Cited

U.S. PATENT DOCUMENTS

| 6,268,709 B1 * | 7/2001 | Lee et al. ................... 320/112 |
| 6,573,684 B2 * | 6/2003 | Yamashita .................. 320/112 |

\* cited by examiner

*Primary Examiner*—Edward H Tso
(74) *Attorney, Agent, or Firm*—Fitzpatrick, Cella, Harper & Scinto

(57) ABSTRACT

Electronic equipment capable of removing a stain etc. formed on an electrode surface of a battery is disclosed. The electronic equipment comprises a battery chamber which houses a battery, and a battery contact member which is provided in the battery chamber and includes a contact portion contacting the battery housed in the battery chamber. Here, the contact portion is formed by bending a part of the battery contact member so as to protrude from the battery contact member and to have curvature. In a case where the battery is housed in the battery chamber, the contact portion moves while contacting the battery depending on movement of the battery in a direction in which the battery is housed.

3 Claims, 3 Drawing Sheets

ELECTRONIC EQUIPMENT HAVING BATTERY CONTACT MEMBER PROVIDED IN BATTERY CHAMBER

BACKGROUND OF THE INVENTION

1. Field of the Invention

The present invention relates to electronic equipment capable of storing a battery, such as a digital camera.

2. Description of the Related Art

In general, an oxide coating, oil stain etc. formed on an electrode terminal of a battery often causes poor conduction. Therefore, it is necessary to scrape off such foreign matters formed on the electrode surface of the battery by using, for example, a file.

However, such a scraping process is a burden and usually a tedious chore for a user. Therefore, it is desirable to have a battery storage structure that can provide the same effect as scraping off the electrode surface of the battery with a file, during a series of operations in which the battery is loaded into the electronic equipment and then a battery cover is closed.

Conventionally, on a contact member provided in a battery compartment of the electronic equipment, a contact portion for contacting the electrode surface of a battery is formed in a sharp shape, such as a pin, and the contact portion and the electrode surface of the battery come into contact with each other by the pressing force caused when the battery is loaded in the battery compartment. Such a structure is often applied to, for example, the electronic equipment requiring for a high voltage.

In recent years, with the use of high-specification electronic equipment, power consumption tends to increase. In the electronic equipment driven by batteries, it is required that the operating time of the electronic equipment should not be shortened even at higher power consumption. Particularly, although digital cameras temporarily require a high voltage, most of the digital cameras use AA-size batteries as a power source. However, when such AA-size batteries are used, it becomes more important to repress the voltage drop of electronic equipment caused by poor electric conduction, and to decrease contact resistance.

However, since a conventional contact portion has a shape (a pointed shape) that deeply comes into contact with the electrode surface of a battery, that is, the contact portion sticks to the electrode surface of the battery when the battery is loaded into the battery compartment, the contact portion does not slide on the electrode surface of the battery by the force alone generated when the battery is inserted into the battery compartment. Thus, it is difficult to effectively remove an oxide coating, oil stain, etc. formed on the electrode surface of the battery. Further, when the battery comes into contact with the contact member, the battery abuts on the wall surface of the battery compartment with a slant angle to the direction in which the battery is inserted by a large frictional resistance between the electrode surface of the battery and the contact portion. As a result, the contact pressure between the electrode of the battery and the contact member of the electronic equipment decreases, which consequently increases the contact resistance therebetween.

SUMMARY OF THE INVENTION

Accordingly, the present invention is designed to solve the above-mentioned problems, and it is an object of the present invention to provide electronic equipment capable of removing a stain etc. formed on the electrode surface of a battery.

One aspect of the electronic equipment of the present invention comprises a battery chamber which houses a battery, and a battery contact member which is provided in the battery chamber and includes a contact portion contacting the battery housed in the battery chamber. Here, the contact portion is formed by bending a part of the battery contact member so as to protrude from the battery contact member and to have curvature. In a case where the battery is housed in the battery chamber, the contact portion moves while contacting the battery depending on movement of the battery in a direction in which the battery is housed.

Another aspect of the electronic equipment of the present invention comprises a battery chamber which houses a battery and a battery contact member which is provided in the battery chamber and includes at least a first and a second contact portions contacting the battery housed in the battery chamber. Here, in a case where the battery is housed in the battery chamber, depending on movement of the battery in a direction in which the battery is housed, the first contact portion moves along a circumference of a circle whose center is a first point in the clockwise direction while contacting the battery. And the second contact portion moves along a circumference of a circle whose center is a second point in the counterclockwise direction while contacting the battery.

The features of the electronic equipment according to the present invention will be clarified with the accompanying drawings and the following detailed description of the preferred embodiments.

DESCRIPTION OF THE PREFERRED EMBODIMENTS

Embodiment 1

Figure 6:
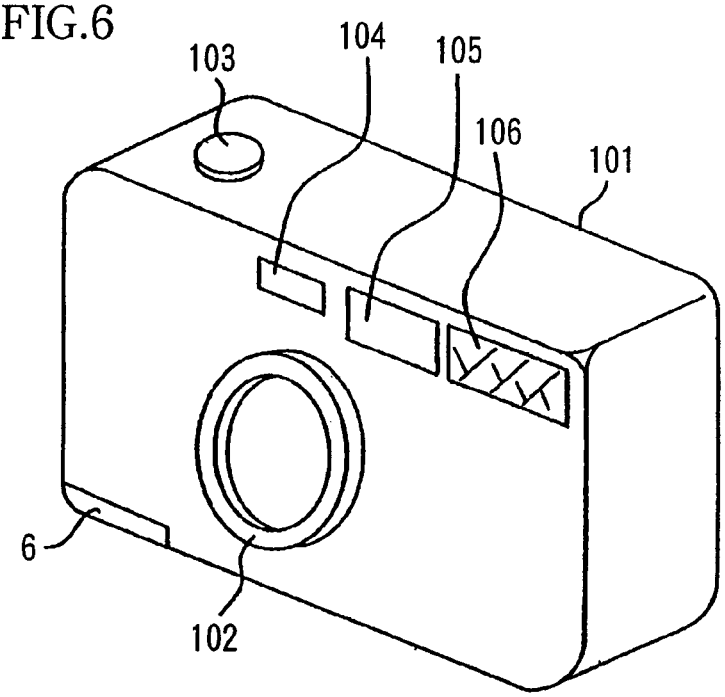
FIG. 6 is a perspective view illustrating the appearance of the camera according to Embodiment 1.

FIG. 6 is a perspective view illustrating the appearance of a digital camera (electronic equipment) according to Embodiment 1 of the present invention. In FIG. 6, reference numeral 101 indicates a camera body in which various members needed for image-taking, for example, an image pickup element such as a CCD sensor or a CMOS image sensor for photoelectrically converting an optical image into electric signals, an optical low-pass filter, and a control circuit for controlling the overall operation of the camera, are arranged.

Reference numeral 102 indicates a lens barrel having an image-taking lens therein, and the focal length of an image-taking optical system can be changed by extending or retracting the lens barrel 102 in the direction of the optical axis. Reference numeral 103 indicates a release button. Image-taking preparatory operations including focusing operation and photometry operation, etc. are started by half pushing the release button 103, and an image-taking operation, that is, an operation of writing on a storage medium an image data produced by performing a predetermined process on the signals read out from the image pickup element, is started by fully pushing the release button 103.

Reference numeral 104 indicates a window portion for a finder optical system through which a photographer can view an object for image-taking. Reference numeral 105 indicates a widow portion for a photometric sensor for measuring the brightness of an object. A result measured by the photometric sensor is transmitted to the control circuit in the camera body 101, and then the control circuit calculates exposure values (shutter and aperture value). Reference numeral 106 indicates a window portion for an illuminating unit for emitting illumination light to the object.

A battery cover 6 is rotatably mounted on a bottom surface of the camera body 101. By rotating the battery cover 6, an opening of a battery compartment provided inside the camera body 101 for storing batteries is opened or closed.

Figure 1A:
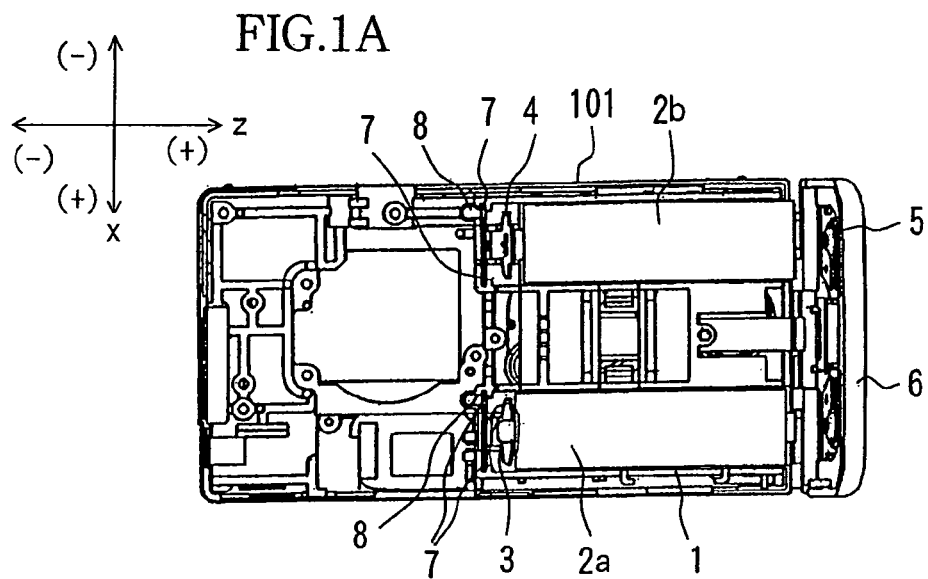
FIG. 1A is a cross-sectional view mainly illustrating a battery compartment of a digital camera according to Embodiment 1 of the present invention.
Figure 1B:
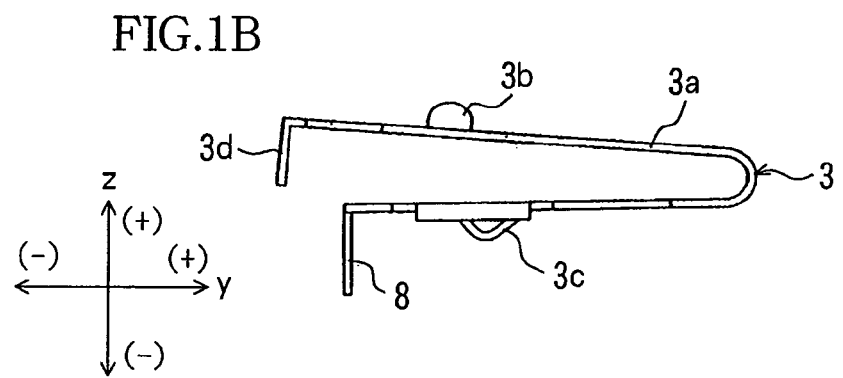
FIG. 1B is a side view of a battery contact member.
Figures 2A, 2B:
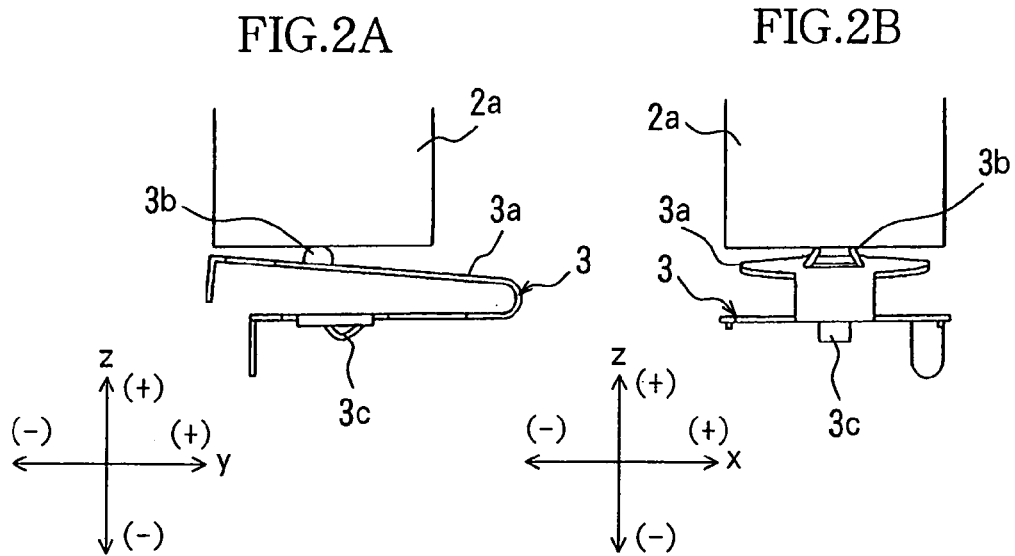
FIGS. 2A and 2B are views illustrating contact states between a battery and a battery contact member according to Embodiment 1 when the battery is inserted in the battery compartment.

FIG. 1A is a longitudinal cross-sectional view of the camera according to Embodiment 1, in which the cross section of a battery compartment is also shown. FIG. 1B shows a battery contact member provided in the battery compartment. In addition, FIGS. 2A and 2B are views illustrating states in which the battery contact member comes into contact with the battery when the battery is loaded in the battery compartment, wherein FIG. 2A is a view illustrating the state as seen from the x direction, and FIG. 2B is a view illustrating the state as seen from the y direction.

Further, the x direction indicates the height direction (or the horizontal direction) of the camera, the y direction indicates the thickness direction of the camera, and the z direction is the horizontal direction (or the height direction) of the camera.

The structure of the battery compartment will be described with reference to FIGS. 1 and 2. The explanation of the structures of members other than the battery compartment will be omitted because the members have the same structures as those in a conventional camera.

Reference numeral 1 indicates a battery compartment provided inside the camera body 101, and the battery compartment can store two AA-size batteries 2a and 2b Reference numeral 3 indicates a battery contact member provided in the battery compartment 1, and the battery contact member 3 comes into contact with a negative electrode of the battery 2a stored in the battery compartment 1.

As shown in FIGS. 1B, 2A and 2B, the battery contact member 3 is manufactured by bending an elastic metal plate and has an arm portion 3a. In addition, the arm portion 3a is provided with a contact portion 3b brought into contact with the negative electrode of the battery 2a. As shown in FIG. 2B, the contact portion 3b is formed by bending parts of the arm portion 3a at its side edge so as to protrude from the upper surface of the arm portion 3a, and the tip of the contact portion 3b is formed in a semicircular shape, that is, in a shape having curvature.

Herein, the width and thickness of the arm portion 3a are arranged such that a sufficient contact pressure can be applied to an electrode portion of the battery 2a through the contact portion 3b. In addition, the battery contact member 3 further includes a convex elastic portion 3c having curvature formed by a bending process.

Further, a front end portion 3d of the arm portion 3a is bent substantially in the direction in which the battery is inserted. The battery contact member 3 is elastically deformed by the insertion of the battery 2a, and the arm portion 3a rotates around its base end side as the center. Then, the front end portion 3d abuts on an inner wall of the battery compartment 1, so that the rotation of the arm portion 3a is limited so as not to rotate beyond a predetermined angle range. Therefore, it is possible to repress the plastic deformation of the battery contact member 3.

Reference numeral 4 indicates a battery contact member provided inside the battery compartment 1, and the battery contact member 4 comes into contact with a positive electrode of the battery 2b stored in the battery compartment 1. The battery contact member 4 has substantially the same shape as that of the battery contact member 3, but is not provided with a portion corresponding to the front end portion 3d of the battery contact member 3.

Reference numeral 5 indicates a battery contact member provided at the battery cover 6, and the battery contact member 5 comes into contact with the negative electrode of the battery 2b stored in the battery compartment 1 and the positive electrode of the battery 2a stored in the battery compartment. Herein, the two batteries 2a and 2b are stored in the battery compartment 1, and the two batteries 2a and 2b are connected to each other in series by the battery contact member 5.

Next, a method of mounting the battery contact members 3 and 4 in the battery compartment will be described.

First, the battery contact members 3 and 4 are mounted in the battery compartment 1 by inserting the battery contact members 3 and 4 into groove portions 7 provided in the battery compartment 1 while sliding them. Herein, hole portions (not shown) are provided in the battery compartment 1, and an elastic portion 3c of the battery contact member 3 (4) can be inserted into the hole portion. As such, the elastic portion 3c is fixed in the hole portion by inserting the elastic portion 3c into the hole portion, thereby accurately mounting the battery contact member 3 in the battery compartment 1 without backlash.

Further, a lead line arranged in the camera body 101 is soldered to a soldering portion 8 provided for the battery contact member 3 (4). Therefore, the power of the batteries 2a and 2b is supplied to various electric elements provided in the camera body 101 through the lead line.

In the structure of the battery compartment 1 as described above, when loading the battery 2a into the battery compartment 1 and closing the battery cover 6, the battery contact member 3 is pressed by the battery 2a so as to be elastically deformed. At that time, the arm portion 3a of the battery contact member 3 rotates around its base end portion (the bent portion of the battery contact member 3) as an axis (rotation around the x-axis), that is, rotates in the plane including the direction (the z direction) in which the battery 2a is inserted. Then, the contact portion 3b formed in the arm portion 3a slides to the negative y direction with respect to the electrode portion of the battery 2a in accordance with the rotation of the arm portion 3a.

Herein, since the tip of the contact portion 3b of the battery contact member 3 is formed in a semicircular shape as described above, it is possible to minimize the contact area between the contact portion 3b and the electrode portion of the battery 2a, and thus to reduce the frictional force between the contact portion 3b and the electrode portion of the battery 2a caused when the contact portion 3b moves in the y direction with respect to the electrode portion of the battery 2a. In addition, since the battery contact member 3 is elastically deformed, the contact portion 3b slides with respect to the electrode portion of the battery 2a with a certain degree of biasing force. Therefore, it is possible to much effectively scrape off an oxide coating, stain, etc. formed on the electrode portion of the battery 2a, and thus to repress poor conduction of the battery 2a.

Furthermore, at the same time, since the tip of the contact portion 3b is formed in a semicircular shape as described above, it is possible to minimize the contact area between the contact portion 3b and the electrode portion of the battery 2a. Therefore, it is possible to repress the battery 2a from leaning to the y direction in the battery compartment 1, and thus to repress reduction in the contact pressure between the contact portion 3b and the electrode portion of the battery 2a.

Embodiment 2

Figure 3:
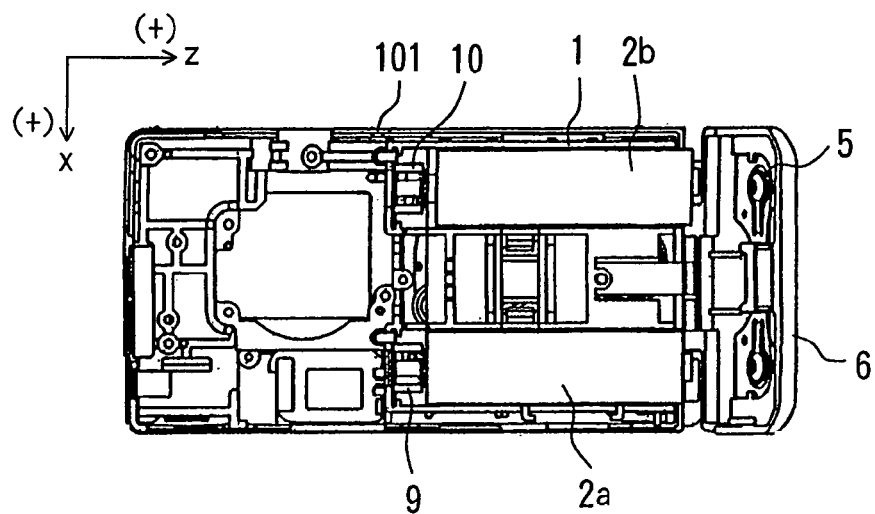
FIG. 3 is a cross-sectional view mainly illustrating a battery compartment of a digital camera according to Embodiment 2 of the present invention.
Figure 4:
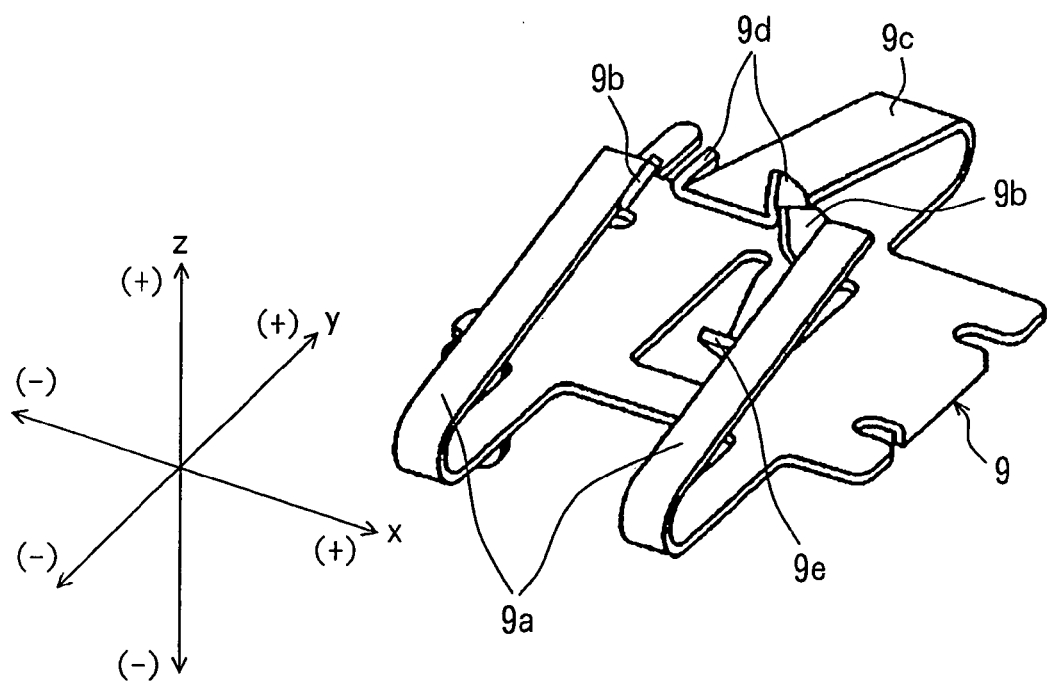
FIG. 4 is a perspective view illustrating the appearance of a battery contact member according to Embodiment 2.

FIG. 3 is a longitudinal cross-sectional view illustrating a digital camera (electronic equipment) according to Embodiment 2 of the present invention, in which the cross section (the same cross section as that in FIG. 1A) including a battery compartment is shown. FIG. 4 is a perspective view illustrating the appearance of a battery contact member 9 according to Embodiment 2.

Figure 5A:
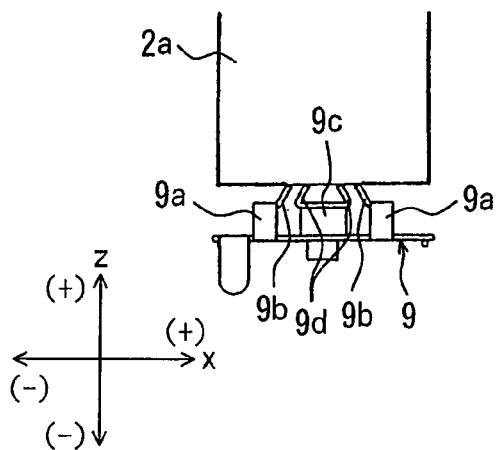
FIGS. 5A and 5B are views illustrating contact states between a battery and a battery contact member according to Embodiment 2 when the battery is inserted in the battery compartment.
Figure 5B:
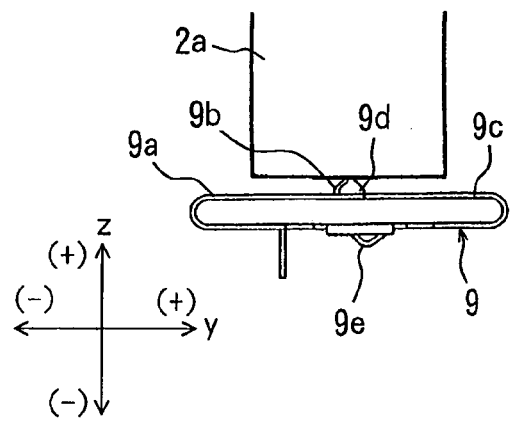

Further, FIGS. 5A and 5B are views illustrating a contact state between a battery contact member 9 and an electrode portion of a battery when the battery is loaded into the battery compartment, wherein FIG. 5A is a view showing the state as seen from the y direction, and FIG. 5B is a view showing the state as seen from the x direction. Herein, the x direction indicates the height direction (or the horizontal direction) of the camera, the y direction indicates the thickness direction of the camera, and the z direction indicates the horizontal direction (or the height direction) of the camera.

The structure of the camera and the peripheral structure of the battery compartment according to Embodiment 2 are substantially the same as those in Embodiment 1, and thus the same components as those in Embodiment 1 have the same reference numerals. Battery contact members 9 and 10 of Embodiment 2 differ from those in Embodiment 1 in shape. In addition, a mounting method of the battery contact members 9 and 10 according to Embodiment 2 is the same as that in Embodiment 1, and thus an explanation thereof will be omitted.

First, the shape of the battery contact member 9, which is provided in the battery compartment 1 and comes into contact with a negative electrode of the battery 2a, will be described with reference to FIG. 4. In addition, since the shape of the battery contact member 10, which is provided in the battery compartment 1 and comes into contact with a positive electrode of the battery 2b, is the same as that of the battery contact member 9, a description thereof will be omitted.

The battery contact member 9 includes two first arm portions 9a that extend substantially in the y direction and are arranged alongside in the x direction and a second arm portion 9c extending substantially in the y direction. Those arm portions 9a and 9c are formed in a bent shape as shown in FIG. 4.

Contact portions 9b which come into contact with an electrode portion of the battery 2a are formed at the tips of the first arm portions 9a, respectively. And two contact portions 9d which come into contact with the electrode portion of the battery 2a are formed at the tip of the second arm portion 9c. Each of those contact portions 9b and 9d has a tapered shape in which the width narrows toward the tip side.

Further, the battery contact member 9 has a protruding portion 9e which protrudes in the negative z direction, and the protruding portion 9e is inserted into a hole portion (not shown) provided in the battery compartment 1. In this way, it is possible to mount the battery contact member 9 in the battery compartment 1 without backlash.

In the structure of the battery compartment 1 according to Embodiment 2, when the battery 2a is loaded into the battery compartment 1, the electrode portion of the battery 2a comes into contact with the contact portions 9b and 9d respectively protruding from the arm portions 9a and 9c. At this time, the electrode portion of the battery 2a comes into contact with the tips (the edges) of the contact portions 9b and 9d.

Then, when closing the battery cover 6, the battery cover 6 presses the battery 2a to move to the negative z direction. At this time, the battery 2a presses the arm portions 9a and 9c of the battery contact member 9, so that the arm portions 9a and 9c are elastically deformed. That is, the first arm portions 9a rotate in one direction (clockwise direction) around the x-axis with their bent portions as the centers, and the second arm portion 9c rotates in the opposite direction (counterclockwise direction) around the x-axis with its bent portion as the center.

Accordingly, the contact portions 9b slide to the positive y direction with respect to the electrode portion of the battery 2a, and the contact portions 9d slide to the negative y direction with respect to the electrode portion of the battery 2a. In this case, since the arm portions 9a and 9c are elastically deformed, the tips of the contact portions 9b and 9d slide with a certain degree of biasing force with respect to the electrode portion of the battery 2a. Thus, when an oxide coating, stain, etc. is formed on the electrode portion of the battery 2a, it is possible to scrape off the oxide coating, stain, etc. with the contact portions 9b and 9d, and thus to repress the poor conduction between the battery contact member 9 (the contact portions 9b and 9d) and the electrode portion of the battery 2a due to the above stain etc.

Furthermore, the arm portions 9a and 9c are formed so as to have the same length and thickness, and the summed width of the two first arm portions 9a is substantially equal to the width of the second arm portion 9c. Therefore, the frictional force of the contact portions 9b against the electrode portion of the battery 2a in the positive y direction is substantially equal to the frictional force of the contact portion 9d against the electrode portion in the negative y direction. As a result, it is possible to repress the battery 2a from leaning to one side (the positive y direction or the negative y direction), and to reliably scrape the above stain formed the electrode portion of the battery 2a.

In this way, it is possible to repress the battery 2a from leaning to one side in the battery compartment 1 and thus from coming into contact with an inner wall of the battery compartment 1. As a result, it is possible to repress an increase in the contact resistance between the battery contact member 9 and the battery 2a due to the reduction in contact pressure therebetween.

Further, according to Embodiment 2, the battery contact member 9 comes into contact with the electrode portion of the battery 2a at four points. However, the number of arm portions (contact portions) of the battery contact member may be increased in order to increase the number of contact points with the electrode portion of the battery. In addition, according to Embodiment 2, as shown in FIG. 4, the arm portions extend substantially in the y direction. However, the arm portions may extend substantially in the y direction and substantially in the x direction.

In the above-mentioned structure, it is possible to reduce the contact resistance between a battery contact member and an electrode portion of a battery.

A digital camera is exemplified in the above-mentioned embodiments, but the present invention can be applied to electronic equipment capable of storing batteries, such as a portable game machine and a remote controller.

Furthermore, according to the above-mentioned embodiments, the arm portions of the battery contact members are formed in a bent shape, and the arm portions rotate as a battery is loaded into the battery compartment. However, a structure may be used in which a battery contact member corresponding to the arm portion according to each embodiment is provided and the arm portion is arranged to rotate while applying biasing force toward the battery. That is, this structure enables the removal of an oxide coating, oil stain, etc. formed on the electrode surface of the battery.

According to the above-mentioned embodiments, when a battery is stored in a battery compartment, at least a portion of a battery contact member rotates while being elastically deformed in the plane including the direction in which the battery is inserted, so that contact portion can be slide with respect to the battery (an electrode portion). Thus, it is possible to much effectively remove an oxide coating, stain, etc. formed on the electrode surface of the battery.

Further, since the tip of a contact portion is formed in a shape having curvature, it is possible to much effectively remove a stain etc. formed on the electrode surface of the battery. In addition, by reducing the contact area between contact portion and the battery, it is possible to repress the battery from leaning to one side in the battery compartment.

Furthermore, by providing a plurality of contact portions in a battery contact member, it is possible to effectively remove more stain etc. formed on an electrode surface of a battery, and also by increasing the number of contact points with the battery, it is possible to improve the conductivity between the battery contact member and the battery.

Moreover, since the plurality of contact portions are arranged to come into contact with the battery with the same reaction force, it is possible to repress the battery from leaning to one side in the battery compartment, and also to repress reduction in the contact pressure between the battery contact member and the battery.

More specifically, the battery contact member is provided with a plurality of arm portions each extending in a certain direction and having a contact portion. In addition, the thicknesses of the plurality of arm portions are substantially equal to each other, and the summed width of the arm portions extending in the same direction is substantially the same. In this way, the reaction forces act on the battery in a plurality of directions can be substantially equal to each other. In such a case, it is possible to manufacture a battery contact member having a plurality of arm portions using a single plate-shaped member, thereby decreasing the number of component members.

While preferred embodiments have been described, it is to be understood that modification and variation of the present invention may be made without departing from the scope of the following claims.

This application claims priority from Japanese Patent Application No. 2003-341283 filed on Sep. 30, 2003, which is hereby incorporated by reference herein.

What is claimed is:

1. Electronic equipment comprising:
a battery chamber which houses a battery; and
a battery contact member which is provided in the battery chamber and includes at least first and second contact portions contacting the battery housed in the battery chamber,
wherein in a case where the battery is housed in the battery chamber, depending on movement of the battery in a direction in which the battery is housed, the first contact portion moves along a circumference of a circle whose center is a first point in the clockwise direction while contacting the battery, and the second contact portion moves along a circumference of a circle whose center is a second point in the counterclockwise direction while contacting the battery.

2. The electronic equipment according to claim 1,
wherein the reaction forces of the first and the second contact portions on the battery are equal to each other.

3. The electronic equipment according to claim 2,
wherein the battery contact member includes a plurality of arm portions, each having the contact portions, extending in a plurality of directions, and
thicknesses of the arm portions are substantially equal to each other, and the summed width of the arm portions extending in the same direction is substantially the same in the respective directions.

* * * * *